United States Patent
Kang et al.

(10) Patent No.: US 7,852,016 B2
(45) Date of Patent: Dec. 14, 2010

(54) LIGHT EMITTING APPARATUS AND CONTROL METHOD THEREFOR

(75) Inventors: Jeong-il Kang, Yongin-si (KR); Sang-hoon Lee, Ulsan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 399 days.

(21) Appl. No.: 11/653,389

(22) Filed: Jan. 16, 2007

(65) Prior Publication Data

US 2007/0217220 A1 Sep. 20, 2007

(30) Foreign Application Priority Data

Mar. 15, 2006 (KR) .................. 10-2006-0024017

(51) Int. Cl.
*H05B 37/02* (2006.01)
(52) U.S. Cl. .................. 315/291; 315/185 R
(58) Field of Classification Search ............. 315/209 R, 315/225, 291, 307, 360, 185 R
See application file for complete search history.

(56) References Cited

U.S. PATENT DOCUMENTS

| | | | | |
|---|---|---|---|---|
| 6,300,724 B1 * | 10/2001 | Luz et al. | ................ | 315/250 |
| 6,320,330 B1 * | 11/2001 | Haavisto et al. | ........... | 315/291 |
| 7,262,559 B2 * | 8/2007 | Tripathi et al. | ............. | 315/291 |
| 7,746,300 B2 * | 6/2010 | Zhang et al. | ............... | 345/82 |
| 2003/0227452 A1 | 12/2003 | Hartular | | |
| 2003/0235062 A1 | 12/2003 | Burgyan et al. | | |
| 2006/0001381 A1 * | 1/2006 | Robinson et al. | ........ | 315/185 R |
| 2006/0033482 A1 | 2/2006 | Florence et al. | | |

FOREIGN PATENT DOCUMENTS

| | | |
|---|---|---|
| DE | 10013216 A1 | 9/2001 |
| EP | 1 185 147 B1 | 12/2003 |
| JP | 11-115241 A | 4/1999 |
| JP | 2000-033729 A | 2/2000 |
| JP | 2003-158300 A | 5/2003 |
| KR | 10-2004-0086744 A | 10/2004 |
| KR | 10-2005-0003970 A | 1/2005 |
| KR | 10-2005-0003971 A | 1/2005 |

* cited by examiner

*Primary Examiner*—Douglas W Owens
*Assistant Examiner*—Jimmy T Vu
(74) *Attorney, Agent, or Firm*—Sughrue Mion, PLLC

(57) ABSTRACT

A light emitting apparatus and control method are provided. The light-emitting apparatus includes a light emitting part; a power supplying part; a switching part which is serially coupled to the light emitting part; and a control part which compares a switch voltage level with a comparison level, and controls the power supplying part to supply the driving power having a voltage level decreased by a reference level if the switch voltage level is higher than the comparison level. The control method includes supplying a driving power to the light emitting part; emitting light; measuring a switch voltage level across the switching part, and decreasing a voltage level of the driving power by a reference level if the switch voltage level is higher than the comparison level.

22 Claims, 5 Drawing Sheets

LIGHT EMITTING APPARATUS AND CONTROL METHOD THEREFOR

CROSS-REFERENCE TO RELATED APPLICATIONS

This application claims priority from Korean Patent Application No. 10-2006-0024017, filed on Mar. 15, 2006, in the Korean Intellectual Property Office, the disclosure of which is incorporated herein by reference.

BACKGROUND OF INVENTION

1. Field of Invention

Apparatuses and methods consistent with the present invention relate to a light emitting apparatus and a control method therefor, and more particularly, to a light emitting apparatus which minimizes power consumption of a switching part, and a control method therefor.

2. Description of the Related Art

Generally, a cathode ray tube (CRT) and a flat panel display (FPD) have been used for a display apparatus. Also, a liquid crystal display (LCD), a plasma display panel (PDP), an organic light emitting diode (OLED), a digital light processing (DLP), etc. have been used for the FPD.

Here, the LCD, the DLP, etc. use a light emitting element such as an light emitting diode (LED) or the like as a light source of a back light unit. The LED is a point light source having high brightness and superior color reproduction. For enhancing the quality of a display image, a light emitting apparatus driven by current such as the LED should minimize a ripple of an output current, and needs a driving unit having a rapid response. Here, a current source operating in a linear type is used as the driving unit.

When a light emitting part of a related art light emitting apparatus normally operates, a power supplying part supplies a voltage having a predetermined level. The supplied voltage is applied to the light emitting part and a switching part. Thus, a voltage across the switching part depends on a voltage across the light emitting part. Referring to FIG. 5, if a voltage $V_L$ across the light emitting part decreases, a voltage Vd across the switching part increases.

As the voltage Vd across the switching part increases, the power consumption thereof increases. Especially, in case of LEDs having high brightness used for a light source of a display apparatus, there may be different voltages for the same current, respectively. Thus, a driving voltage should be set so as to be sufficient in consideration of the variation.

Also, if there occurs a damage such as a short circuit of an LED in the light emitting apparatus, a voltage corresponding to a forward voltage drop of the short circuited LED is all applied to the switching part, and accordingly, thus the switching part continues to perform current control.

Also, if a surrounding temperature of an LED is low, a voltage across the LED sensitively decreases as it continues to be driven. If a surrounding temperature thereof is high or the LED is again driven after halting, voltage across the LED sensitively increases. As described above, in the related art light emitting apparatus, a voltage across the switching part varies markedly according to voltage variation due to a damage of the light emitting part such as the LED, voltage deviations among the respective light emitting parts, and voltage variation of the light emitting part due to temperature variation of the light-emitting part.

SUMMARY OF THE INVENTION

The present invention provides a light emitting apparatus capable of keeping a voltage across a switching part, which is serially connected with a light emitting part, uniform, and a control method therefor.

The present invention also provides a light emitting apparatus and a control method therefor which minimizes the power consumption of a switching part.

According to an aspect of the present invention, there is provided a light emitting apparatus comprising a light emitting part which emits light; a power supplying part which supplies a driving power to the light emitting part; a switching part which is serially coupled to the light emitting part; and a control part which compares a switch voltage level across the switching part with a comparison level, and controls the power supplying part to supply the driving power based on a result of the comparison.

The control part may control the power supplying part to supply the driving power having a voltage level decreased by a reference level if the switch voltage level is higher by a threshold amount than the comparison level.

The control part may control the power supplying part to supply the driving power having a voltage level increased by a reference level if the switch voltage level is lower by a threshold amount than the comparison level.

The control part may determine whether the switch voltage level is higher by a threshold amount than the comparison level a number of times, and may control the power supplying part to decrease the voltage level of the driving power by the reference level if the switch voltage level is successively higher by the threshold amount than the comparison level during the number of times, and the control part may determine whether the switch voltage level is lower by a threshold amount than the comparison level a number of times, and may control the power supplying part to increase the voltage level of the driving power by the reference level if the switch voltage level is successively lower by the threshold amount than the comparison level the number of times.

The control part may store a maximum value and a minimum value with respect to the voltage level of the driving power.

The control part may determine that the light emitting part is malfunctioning if the switch voltage level is lower than the comparison level when the driving power reaches the maximum value.

The control part may determine that the light emitting part is malfunctioning if the switch voltage level is higher than the comparison level when the driving power reaches the minimum value.

The light emitting apparatus may further comprise a malfunction outputting part which outputs information about whether the light emitting part is malfunctioning, wherein the control part controls the malfunction outputting part to output the information when the light emitting part is malfunctioning.

The switching part may comprise a switching element which switches on and off current flowing in the light emitting part, and a current measuring part which measures the current flowing in the light emitting part.

The control part may measure the current flowing in the light emitting part through the current measuring part, and controls the switching element so that the measured current is within a range.

The light emitting part may comprise at least one of a light emitting diode (LED) and a laser diode (LD).

The light emitting apparatus may further comprise an illuminating part which gathers light emitted from the light emitting part; a display unit which receives light from the illuminating part to form an image; and a projecting part which magnifies and projects the image formed by the display unit.

The display unit may comprise at least one of a digital micro mirror display (DMD) unit, a liquid crystal on silicon (LCOS) unit, and a liquid crystal display (LCD) unit.

According to another aspect of the present invention, there is provided a control method for a light emitting apparatus comprising a light emitting part and a switching part serially coupled to the light emitting part, the method comprising supplying a driving power to the light emitting part; emitting light from the light emitting part; measuring a switch voltage level across the switching part, and comparing the switch voltage level with a comparison level; and changing a voltage level of the driving power based on a result of the comparison.

The changing the voltage level may comprise decreasing the voltage level of the driving power by a reference level if the switch voltage level is higher by a threshold amount than the comparison level.

The control method may further comprise increasing the voltage level of the driving power by a reference level if the switch voltage level is lower by a threshold amount than the comparison level.

The voltage level of the driving power decreasing stage may comprise determining whether the switch voltage level is higher by a threshold amount than the comparison level a number of times, and decreasing the voltage level of the driving power by the reference level if the switch voltage level is successively higher by the threshold amount than the comparison level during the number of times; and the voltage level of the driving power increasing stage comprises determining a number of times whether the switch voltage level is lower by a threshold amount than the comparison level, and increasing the voltage level of the driving power by the reference level if the switch voltage level is successively lower by the threshold amount than the comparison level during the number of times.

The control method may further comprise storing a maximum value and a minimum value with respect to the voltage level of the driving power; and outputting information that the light emitting part is malfunctioning if the switch voltage level is lower by a threshold amount than the comparison level when the driving power reaches the maximum value.

The control method for the light emitting apparatus may further comprise storing a maximum value and a minimum value with respect to the voltage level of the driving power; and outputting information that the light emitting part is malfunctioning if the switch voltage level is higher by a threshold amount than the comparison level when the driving power reaches the minimum value.

BRIEF DESCRIPTION OF THE DRAWINGS

The above and other aspects of the prevent invention will become apparent and more readily appreciated from the following description of exemplary embodiments, taken in conjunction with the accompany drawings, in which.

DETAILED DESCRIPTION OF EXEMPLARY EMBODIMENTS OF THE INVENTION

Figure 1:
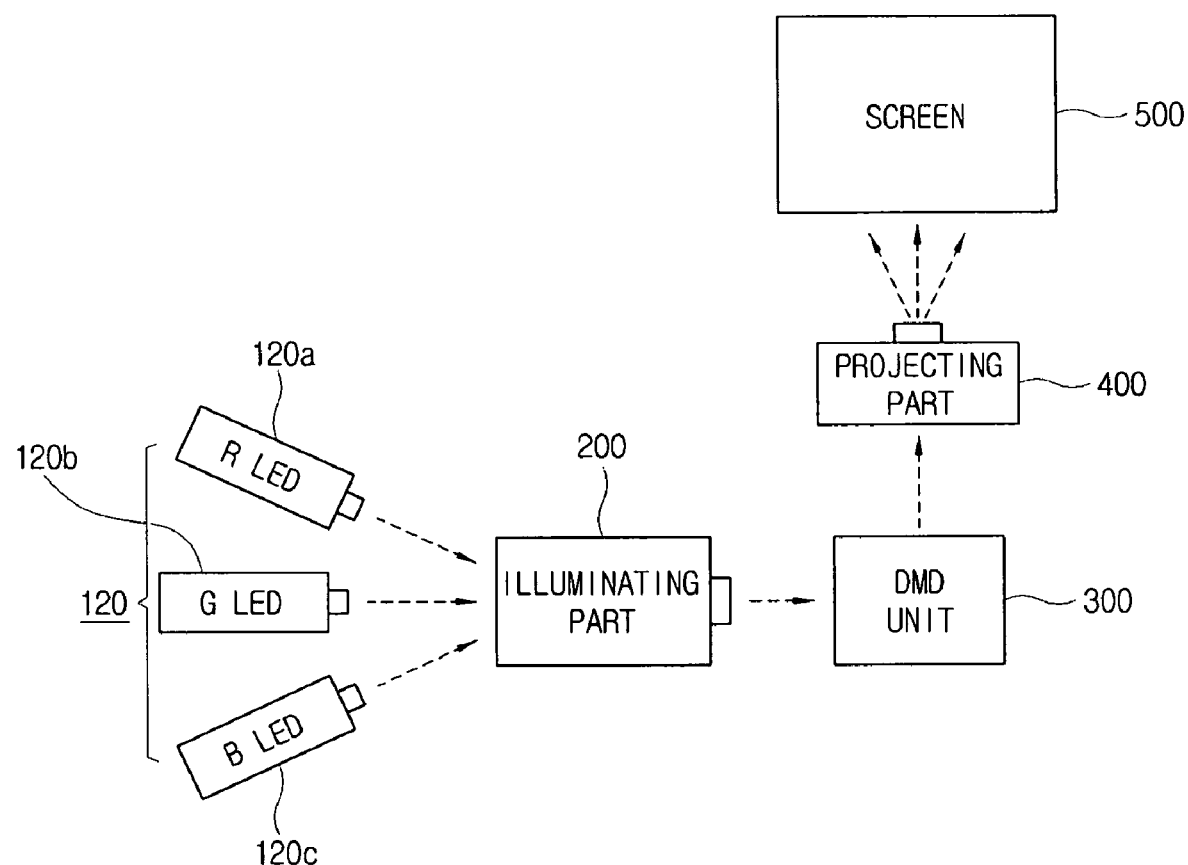
FIG. 1 is a control block diagram of a light emitting apparatus including a projection apparatus according to an exemplary embodiment of the present invention.

Reference will now be made in detail to exemplary embodiments of the present invention, examples of which are illustrated in the accompanying drawings, wherein like reference numerals refer to like elements throughout. Exemplary embodiments are described below so as to explain the present invention by referring to the figures.

As shown in FIG. 1, a light emitting apparatus according to an exemplary embodiment of the present invention includes a projection apparatus such as a projection television (TV). The light emitting apparatus includes a light emitting part 120, an illuminating part 200, a digital micro mirror display (DMD) unit 300 as a display unit, a projecting part 400 and a screen 500.

The light emitting part 120 supplies light for displaying an image on the screen 500. The light emitting part 120 includes a plurality of LEDs respectively emitting a red light, a green light and a blue light. The light emitting part 120 includes a red (R) LED 120a, a green (G) LED 120b and a blue (B) LED 120c, and may include other LEDs emitting other colored lights. For example, the light emitting part 120 may include a cyan LED emitting a cyan light, a yellow LED emitting a yellow light, a magenta LED emitting a magenta light, a white LED emitting a white light, or other LEDs emitting other colored lights. Alternatively, the light emitting part 120 may include a laser diode instead of the LED.

The illuminating part 200, which gathers R, G and B lights emitted from the LEDs, converts R, G and B lights into uniform parallel lights to focus on the DMD unit 300.

The DMD unit 300 forms an image to be displayed on the screen 500. Alternatively, a cathode ray tube (CRT) unit, an LCD unit, an LCOS unit, or the like may be used as a display unit instead of the DMD unit 300.

The projecting part 400 includes a plurality of lenses to magnify and project an image formed through the DMD unit 300 on the screen 500.

The screen 500 is formed in a rectangular shape or other shapes and displays an image thereon.

Figure 2:
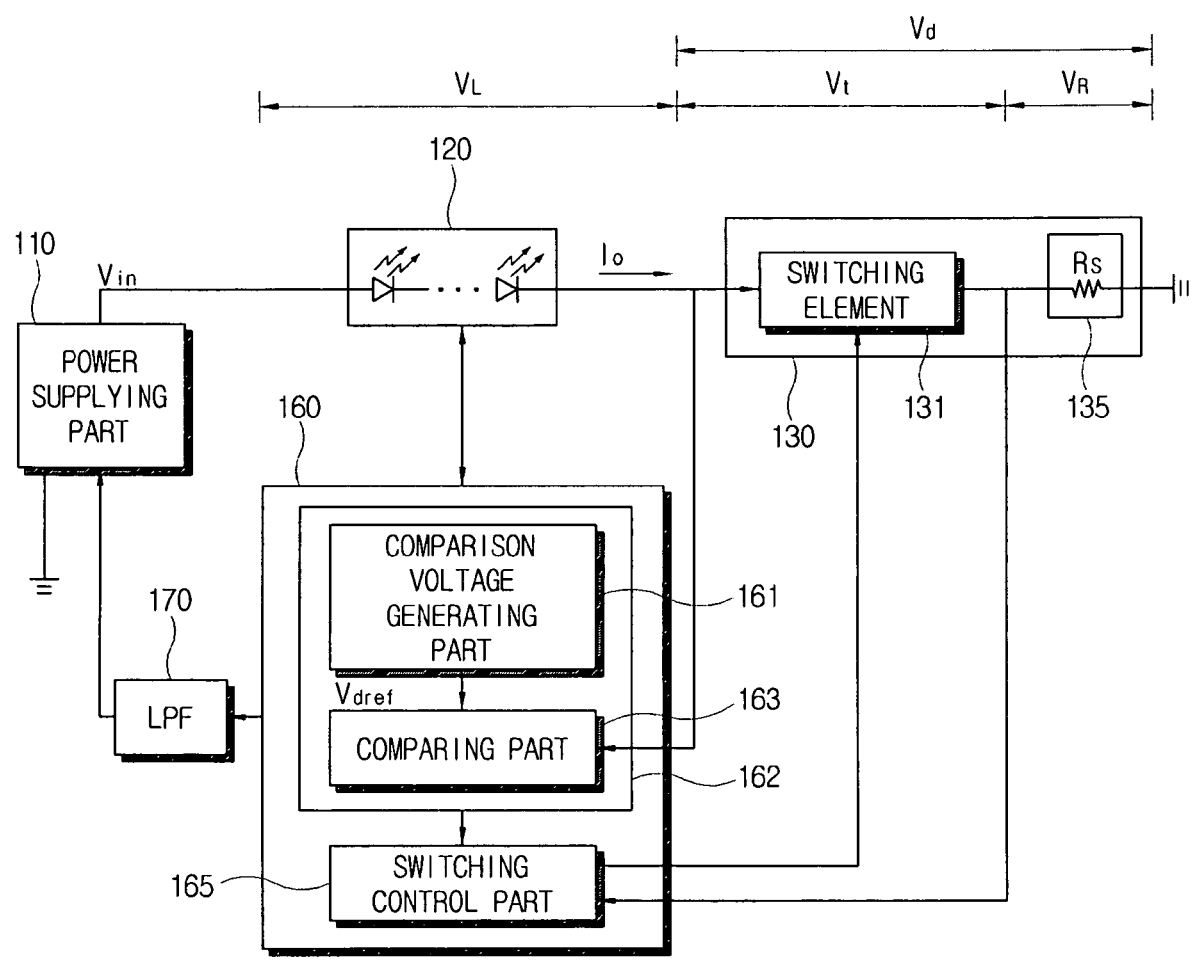
FIG. 2 is a control block diagram of the light emitting apparatus according to the exemplary embodiment of the present invention.

As shown in FIG. 2, the light emitting apparatus according to the exemplary embodiment of the present invention includes the light emitting part 120 and a driving part to drive the light emitting part 120. Here, the driving part denotes all elements shown in FIG. 2 except the light emitting part 120.

The light emitting apparatus includes the light emitting part 120, a power supplying part 110, a switching part 130 serially coupled to the light emitting part 120, and a control part 160 controlling the above components. Also, the light emitting apparatus may further include a low pass filter (LPF) 170.

The power supplying part 110 is a power source to supply a constant voltage to the light emitting part 120, and variably outputs power to the light emitting part 120 under control of the control part 160 so that a voltage $V_d$ across the switching part 130 is kept uniform. It is advantageous for the power supplying part 110 to vary power from a level higher than a maximum voltage supplied to the light emitting part 120 to a level lower than a minimum voltage supplied thereto.

That is, since a forward voltage drop $V_L$ of the light emitting part 120 decreases until being stabilized, it is advantageous for the power supplying part 110 to vary the power from a sufficiently high voltage to an optimal voltage. The power supplying part 110 is provided as a variable DC voltage source, but alternatively, may be provided as other sources.

The light emitting part 120 includes the R LED 120a, the G LED 120b and the B LED 120c, but alternatively, may further include a cyan LED emitting a cyan light, a yellow LED emitting a yellow light, a magenta LED emitting a magenta light, a white LED emitting a white light, or other LEDs emitting other colored lights.

The LEDs 120a, 120b and 120c of the light emitting part 120 are serially coupled together. Alternatively, the light emitting part 120 may be provided as a plurality of light emitting parts, and the respective light emitting parts 120 may be connected in series, in parallel or to a separate circuit. The light emitting part 120 may include at least one LED.

The switching part 130 is serially coupled to the light emitting part 120, and generates a constant current by using the constant voltage supplied from the power supplying part 110. The switching part 130 includes a switching element 131 such as a field effect transistor (FET), a bipolar junction transistor (BJT), or the like. Since current flowing through a collector and an emitter of the BJT, or a drain electrode and a source electrode of the FET can be controlled by respectively controlling a signal supplied to a base of the BJT or a gate electrode of the FET, power can be accurately supplied to the light emitting part 120 with rapid switching speed and no noise. For example, current flowing through the drain electrode and the source electrode of the FET is kept uniform irrespective of voltage supplied therethrough, and accordingly a constant current can be generated.

The switching part 130 includes a current measuring part 135 which measures current applied to the light emitting part 120. The current measuring part 135 is coupled to the switching element 131 and a ground terminal, and measures the amount of current flowing through the switching element 131. The resistance of the current measuring part 135 is so small that a voltage $V_R$ across the current measuring part 135 can be ignored. Since the light emitting part 120, the switching element 131 and the current measuring part 135 are serially coupled, the amount of current flowing therethrough is the same. The switching part 130 includes the current measuring part 135, but alternatively, the current measuring part 135 may be provided separately with respect to the switching part 130.

The current measuring part 135 is provided as a simple resistor, but alternatively, may be provided as a current measuring circuit including a hall sensor to measure current.

The light emitting part 120, the switching element 131 and the current measuring part 135 are arranged in order, but they may be provided to have other arrangements.

The LPF 170 converts a control signal input from the control part 160 so as to be compatible with the power supplying part 110. The control part 160 includes digital logic provided with a digital signal processor (DSP) or a field programmable gate array (FPGA), and the LPF 170 filters a pulse width modulated (PWM) signal output from the control part 160 to extract a direct current component from the PWM signal.

Alternatively, a digital to analog converter (DAC) may be provided instead of the LPF 170. An analog to digital converter (ADC) may be provided to convert a signal input to the control part 160 into a digital signal. The control part 160 may be designed as either a digital circuit or an analog circuit.

The control part 160 includes a main control part 162 and a switching control part 165.

The switching control part 165 measures current flowing through the switching part 130, and receives a reference current Ir having a range from the main control part 162 to control the switching element 131 so that the measured current is within the range. The range may be predetermined. The switching control part 165 measures a voltage across the current measuring part 135, and calculates current supplied to the switching element 131 according to the formula V=IR, with the resistance of the current measuring part 135 fixed as Rs.

As long as power supplied from the power supplying part 110 is kept higher than the forward voltage drop $V_L$ of the light emitting part 120, the switching control part 165 can control such that the measured current is within the range irrespective of a property of the switching element 131, the supplied power, and the forward voltage drop $V_L$.

The main control part 162 includes a comparison voltage generating part 161 and a comparing part 163, and controls the power supplying part 110 so that the voltage across the switching part 130 is kept uniform against variation of the voltage $V_L$ across the light emitting part 120. The voltage across the switching part 130 is advantageously a voltage $V_t$ across the switching element 131, but may be actually the voltage $V_d$, which the sum of the voltage $V_t$ across the switching element 131 and the voltage $V_R$ across the current measuring part 135. However, the voltage $V_R$ across the current measuring part 135 is so minute that the voltage $V_R$ may be ignored. Thus, the voltage $V_d$ across the switching part 130 is similar to the voltage $V_t$ across the switching element 131.

The voltage $V_d$ across the switching part 130 varies according to the voltage $V_L$ across the light emitting part 120. Voltage level of a driving power supplied from the power supplying part 110 is distributed into the voltage $V_d$ across the switching part 130 and the voltage $V_L$ across the light emitting part 120. As the voltage $V_d$ increases, the power consumption in the switching part 130 increases.

Accordingly, although there is an environmental variation or a property variation of the light emitting part 120, the voltage $V_d$ across the switching part 130 can be kept uniform by varying a power supplied to the light emitting part 120. Also, the voltage $V_d$ across the switching part 130 is advantageously set to have a voltage level to minimize the power consumption therein.

The comparison voltage generating part 161 applies a comparison level to the comparing part 163. The comparing part 163 compares the comparison level receiving from the comparison voltage generating part 161 with a voltage level of the switching part 130, that is, a switch voltage level.

The main control part 162 controls a level of a driving voltage $V_{in}$ which the power supplying part 110 supplies based on a comparison result of the comparing part 163. The main control part 162 advantageously reads an output of the comparing part 163 when a period of time elapses after the power is supplied to the light emitting part 120, because it takes time for a level of current flowing the light emitting part 120 and an output of the comparing part 163 to be stabilized. The period of time may be predetermined.

If the switch voltage level is higher by a difference (i.e., a threshold amount) than the comparison level, the main control part 162 controls the power supplying part 110 so that the power supplying part 110 supplies the driving power to have a voltage level decreased by a reference level. If the switch voltage level is lower by a difference (i.e. a threshold amount) than the comparison level, the main control part 162 controls the power supplying part 110 so that the power supplying part 11 supplies the driving power to have a voltage level increased by a reference level. The main control part 162 continuously controls the power supplying part 110 to vary a level of the driving power in a normal operation period of the light emitting part 120 as well as in an initial operation period thereof. The normal operation period of the light emitting part 120 denotes a period from a time when current and voltage supplied to the light emitting part 120 is stabilized to a time when the light emitting part 120 finishes operating.

That is, the main control part 162 continuously compares a level of the voltage $V_d$ across the switching part 130 with the comparison level in the normal operation period as well as in the initial operation period, and continuously controls a level of the driving power of the power supplying part 110 based on comparison result. Accordingly, the level of the voltage $V_d$ across the switching part 130 can be kept uniform irrespective of a level variation of the voltage $V_L$ across the light emitting part 120.

The control part 160 may determine a number of times whether the switch voltage level is higher by a difference (i.e. a threshold amount) than the comparison level generated by the comparison voltage generating part 161 or not. The control part 160 determines whether the switch voltage level is successively higher by a threshold amount than the comparison level with respect to the number of times or not. If the switch voltage level is successively higher by a difference than the comparison level the number of times, the control part 160 controls the power supplying part 110 to supply the driving power having a voltage level decreased by a reference level. In other words, the control part 160 may take a number of different measurements over time, and compare these measurements with each other to determine if the voltage level is successively increasing over the measurements, and if the switch voltage level is successively increasing by a given amount over the threshold level, the control part 160 controls the power supplying part 110 to supply the driving power having a voltage level decreased by a reference level.

Also, the control part 160 determines a number of times whether the switch voltage level is lower by a difference than the comparison level or not. If the switch voltage level is successively lower by the difference than the comparison level over the number of times, the control part 160 controls the power supplying part 110 to supply the driving power having a voltage level increased by a reference level. The control part 160 may output a PWM signal to the power supplying part 110, and accordingly, a level of the driving power of the power supplying part 110 can be adjusted based on a duty ratio of the PWM signal.

If the switch voltage level is lower by a difference than the comparison level over the number of times, the control part 160 may raise a level of the PWM signal to be output to the power supplying part 110. If the switch voltage level is higher by a difference than the comparison level with respect to number of times, the control part 160 may lower a level of the PWM signal to be output therefrom.

The control part 160 may store information about a maximum value and a minimum value with respect to the voltage level of the driving power. Thus, in controlling the voltage level of the driving power, if the voltage level thereof is to deviate from the maximum value or the minimum value, or still needs to be adjusted despite reaching the maximum value or the minimum value, the control part 160 can determine that the light emitting part 120 is out of order, i.e., is malfunctioning. The information about the maximum value and the minimum value with respect to the voltage level of the driving power may be separately stored. Also, the maximum value and the minimum value may correspond to 100% and 0% of the duty ratio of the PWM signal.

That is, if the driving power reaches the maximum value and the switch voltage level is determined to be lower by a difference than the comparison level during the number of times, the control part 160 can determine that the light emitting part 120 is in an open condition.

If the driving power reaches the minimum value and the switch voltage level is determined to be higher by a difference than the comparison level during the number of times, the control part 160 can determine that the light emitting part 120 is in a short circuited condition.

The light emitting apparatus may further include a malfunction outputting part which outputs information about an operation state of the light emitting part 120. The malfunction outputting part may be provided as the screen 500, and the screen 500 can display whether the light emitting part 120 normally operates or not. Alternatively, the malfunction outputting part may include a speaker (not shown) which generates a beep to inform a user when the light emitting part 120 is determined to be out of order.

Figure 3:
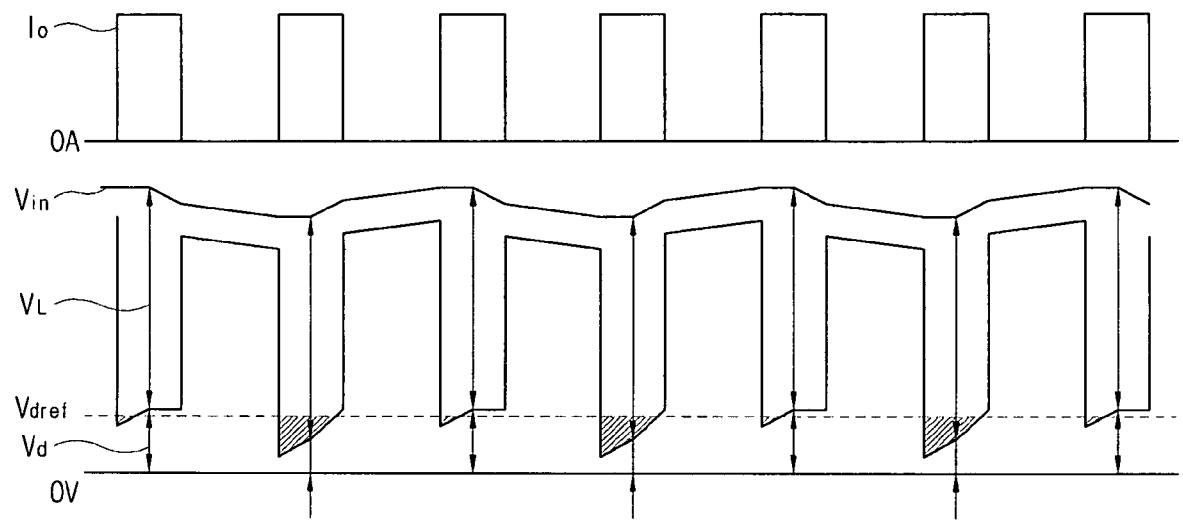
FIG. 3 illustrates variation of current supplied to a light emitting part, a driving voltage supplied from a power supplying part and a voltage across a switching part in the light emitting apparatus according to the exemplary embodiment of the present invention.

Referring to FIG. 3, current Io flowing through the light emitting part 120 is kept uniform. The comparison voltage $V_{dref}$ is fixedly set. The control part 160 controls the driving voltage $V_{in}$ output from the power supplying part 110 according to whether the voltage $V_d$ across the switching part 130 is higher than the comparison voltage $V_{dref}$ or not. As the driving voltage $V_{in}$ is adjusted, the voltage $V_d$ across the switching part 130 can also be adjusted. Thus, the voltage $V_d$ across the switching part 130 can be kept uniform within a range.

Hereinafter, a control method according to an exemplary embodiment of the present invention will be described by referring to FIG. 4.

Figure 4:
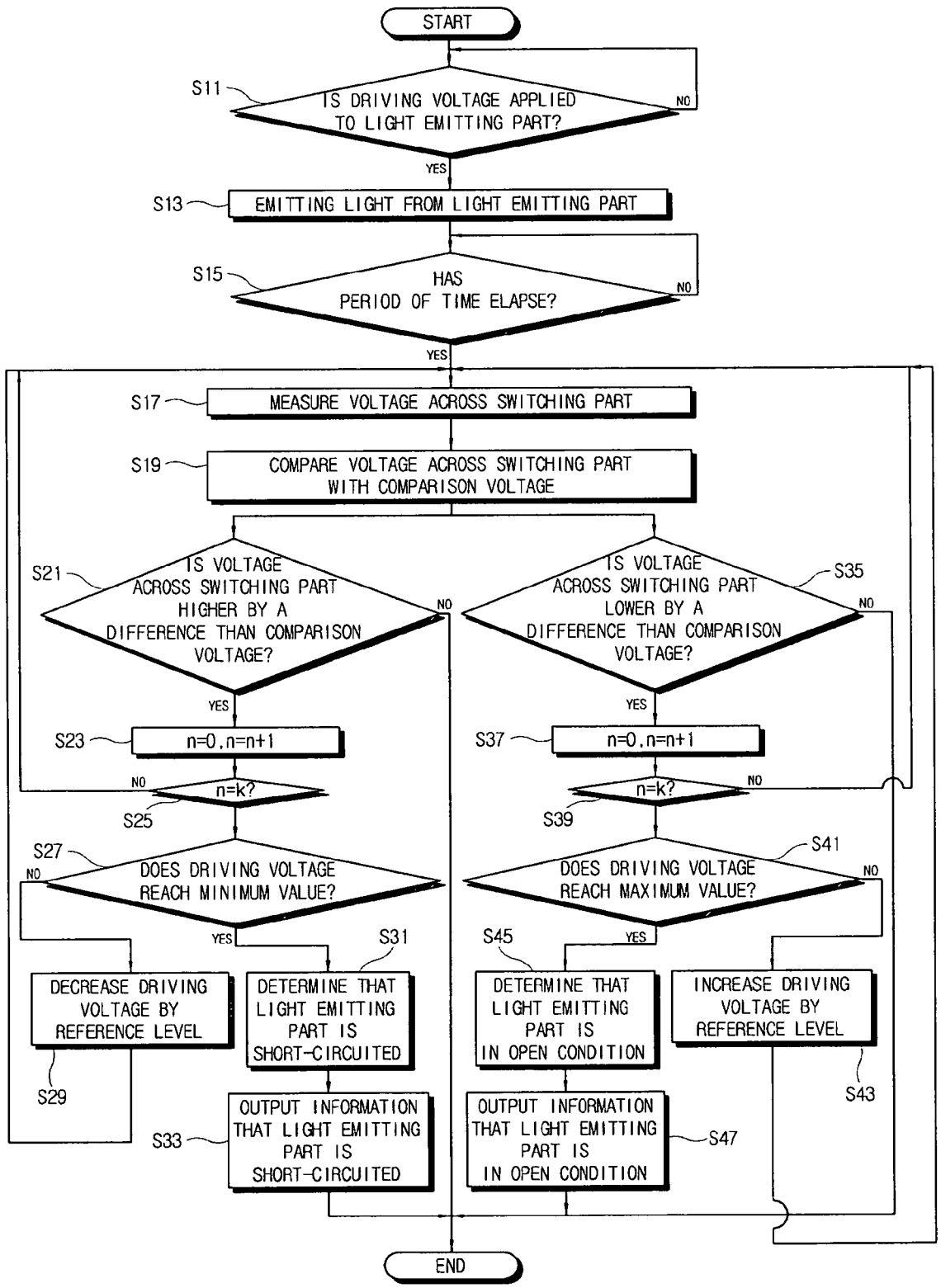
FIG. 4 is a control flowchart illustrating an operation of the light emitting apparatus according to the exemplary embodiment of the present invention.
Figure 5:
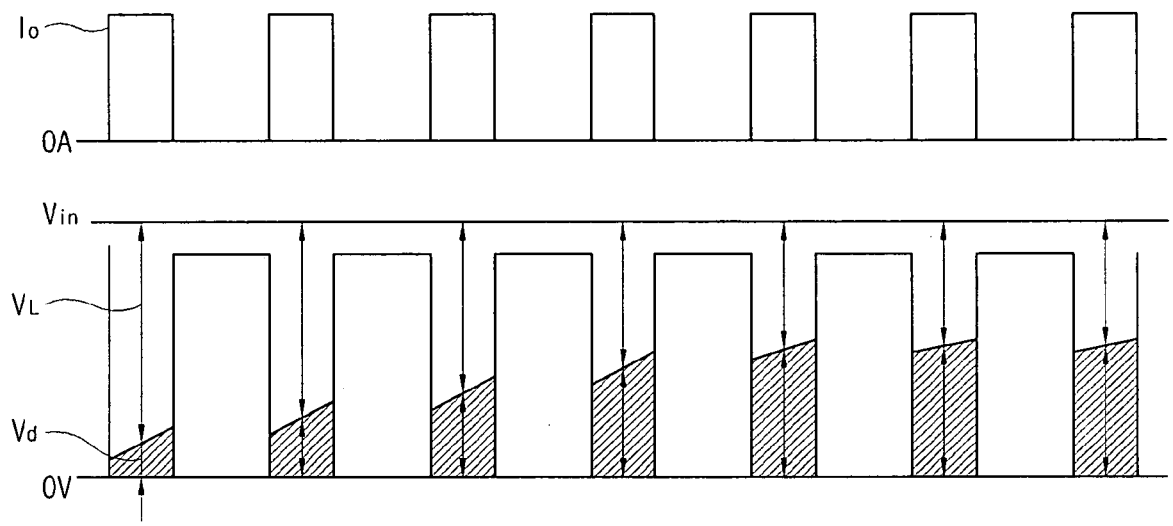
FIG. 5 illustrates variation of current supplied to a light emitting part, a driving voltage supplied from a power supplying part and a voltage across a switching part in a related art light emitting apparatus.

As shown in FIG. 4, the light emitting part 120 receives the driving power from the power supplying part 110 (S11). Then, the light emitting part 120 emits light (S13). Here, it is advantageous for the intensity of light to be controlled based on current supplied to the light emitting part 120.

A period of time passes (S15), and then the control part 160 measures the switch voltage level $V_d$ across the switching part 130 (S17). Then, the comparing part 163 compares the switch voltage level $V_d$ with the comparison level $V_{dref}$ (S19).

If the control part 160 confirms that the switch voltage level $V_d$ is higher by a difference than the comparison level $V_{dref}$ (S21), the control part 160 determines whether a number of times by which the switch voltage level $V_d$ is successively higher by the difference than the comparison level $V_{dref}$ reaches a number of times k (S23 and S25). If the time k is not reached, the switch voltage level $V_d$ is measured again (S17).

If the time k is reached, the control part 160 determines whether the voltage level of the driving power Vin reaches the minimum value (S27).

If the voltage level of the driving power $V_{in}$ does not reach the minimum value, the control part 160 controls the power supply part 110 to lower the voltage level of the driving power $V_{in}$ by a reference level (S29), and then returns to operation S17. If the voltage level of the driving power $V_{in}$ reaches the minimum value, the control part 160 confirms (i.e., determines) that the light emitting part 120 is short circuited (S31). Then, the control part 160 outputs information that the light emitting part 120 is short circuited through the malfunction outputting part (S33).

On the other hand, if the control part 160 confirms that the switch voltage level $V_d$ is not higher by the difference than the comparison level $V_{dref}$ (S21), the control part 160 determines whether the switch voltage level $V_d$ is lower by a difference than the comparison level $V_{dref}$ (S35). If the control part 160 confirms that the switch voltage level $V_d$ is lower by the difference than the comparison level $V_{dref}$, the control part 160 determines whether the number of times by which the switch voltage level $V_d$ is successively lower by the difference than the comparison level $V_{dref}$ reaches a number of times p (S37 and S39).

If the time p is not reached, the switch voltage level $V_d$ is measured again (S17). Here, the times p in operation S25 and operation S39 may be the same or different from each other.

If the time p is reached, the control part 160 determines whether the voltage level of the driving power $V_{in}$ reaches the maximum value (S41). If the voltage level of the driving power $V_{in}$ does not reach the maximum value, the control part 160 controls the power supply part 110 to raise the voltage level of the driving power $V_{in}$ by a reference level (S43), and then returns to operation S17. If the voltage level of the driving power $V_{in}$ reaches the maximum value, the control part 160 determines that the light emitting part 120 is in an open condition (S45). Then, the control part 160 outputs information that the light emitting part 120 is in the open through the malfunction outputting part (S47).

The light emitting apparatus according to the exemplary embodiment of the present invention is provided as the projection TV. However, the light emitting apparatus according to the present invention may be alternatively provided as other apparatuses as long as including the light emitting part 120, the switching part 130 and the control part 160.

The light emitting apparatus according to an exemplary embodiment of the present invention can keep voltage $V_d$ across the switching part 130 uniform irrespective of variation of voltage across the respective LEDs, variation of voltage due to damage to the LED, and/or variation of voltage due to a temperature variation of the LED. Accordingly, the light emitting apparatus according to an exemplary embodiment of the present invention can minimize the power consumption of the switching part 130 and heat generated therefrom.

As described above, a light emitting apparatus and a control method therefor according to exemplary embodiments of the present invention can keep voltage across a switching part serially coupled to a light emitting part uniform.

Accordingly, the light emitting apparatus and the control method therefor according to exemplary embodiments of the present invention can minimize the power consumption of the switching part and heat generated therefrom.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A light emitting apparatus comprising:
a light emitting part which emits light;
a power supplying part which supplies a driving power to the light emitting part;
a switching part which is serially coupled to the light emitting part; and
a control part which compares a switch voltage level across the switching part with a comparison level, and controls the power supplying part to supply the driving power based on a result of the comparison,
wherein the control part controls the power supplying part to supply the driving power having a voltage level decreased by a reference level if the switch voltage level is higher than the comparison level.

2. The light emitting apparatus according to claim 1, wherein the control part controls the power supplying part to supply the driving power having a voltage level increased by the reference level if the switch voltage level is lower than the comparison level.

3. The light emitting apparatus according to claim 2, wherein the control part determines whether the switch voltage level is higher than the comparison level a number of times, and controls the power supplying part to decrease the voltage level of the driving power by the reference level if the switch voltage level is successively higher than the comparison level during the number of times, and
the control part determines whether the switch voltage level is lower than the comparison level a number of times, and controls the power supplying part to increase the voltage level of the driving power by the reference level if the switch voltage level is successively lower than the comparison level during the number of times.

4. The light emitting apparatus according to claim 3, wherein the control part stores a maximum value and a minimum value with respect to the voltage level of the driving power.

5. The light emitting apparatus according to claim 4, wherein the control part determines that the light emitting part is malfunctioning if the switch voltage level is lower than the comparison level when the driving power reaches the maximum value.

6. The light emitting apparatus according to claim 5, further comprising a malfunction outputting part which outputs information about whether the light emitting part is malfunctioning,
wherein the control part controls the malfunction outputting part to output the information if it is determined that the light emitting part is malfunctioning.

7. The light emitting apparatus according to claim 5, wherein the malfunctioning light emitting part is in an open condition.

8. The light emitting apparatus according to claim 4, wherein the control part determines that the light emitting part is malfunctioning if the switch voltage level is higher than the comparison level when the driving power reaches the minimum value.

9. The light emitting apparatus according to claim 8, further comprising a malfunction outputting part which outputs information about whether the light emitting part is malfunctioning,
wherein the control part controls the malfunction outputting part to output the information if it is determined that the light emitting part is malfunctioning.

10. The light emitting apparatus according to claim 8, wherein the malfunctioning light emitting part is in a short circuit condition.

11. The light emitting apparatus according to claim 1, wherein the switching part comprises a switching element which switches on and off current flowing in the light emitting part, and a current measuring part which measures the current flowing in the light emitting part.

12. The light emitting apparatus according to claim 11, wherein the control part measures the current flowing in the light emitting part through the current measuring part, and controls the switching element so that the measured current is within a range.

13. The light emitting apparatus according to claim 1, wherein the light emitting part comprises at least one of a light emitting diode and a laser diode.

14. The light emitting apparatus according to claim 13, further comprising:
    an illuminating part which gathers light emitted from the light emitting part;
    a display unit which receives light from the illuminating part to form an image; and
    a projecting part which magnifies and projects the image formed by the display unit.

15. The light emitting apparatus according to claim 14, wherein the display unit comprises at least one of a digital micro mirror display unit, a liquid crystal on silicon unit, and a liquid crystal display unit.

16. The light emitting apparatus according to claim 1, wherein the control part measures a current flowing through the switching part and controls the switching part using a reference current so that the measured current is within a same range as the reference current.

17. A control method for a light emitting apparatus comprising a light emitting part and a switching part serially coupled to the light emitting part, the method comprising:
    supplying a driving power to the light emitting part;
    emitting light from the light emitting part;
    measuring a switch voltage level across the switching part, and comparing the switch voltage level with a comparison level; and
    changing a voltage level of the driving power based on a result of the comparing,
    wherein the changing the voltage level comprises decreasing the voltage level of the driving power by a reference level if the switch voltage level is higher than the comparison level.

18. The control method according to claim 17, further comprising increasing the voltage level of the driving power by the reference level if the switch voltage level is lower than the comparison level.

19. The control method according to claim 18, wherein decreasing the voltage level of the driving power comprises:
    determining whether the switch voltage level is higher than the comparison level a number of times, and
    decreasing the voltage level of the driving power by the reference level if the switch voltage level is successively higher than the comparison level during the number of times; and
    the increasing the voltage level of the driving power comprises:
    determining a number of times whether the switch voltage level is lower than the comparison level, and
    increasing the voltage level of the driving power by the reference level if the switch voltage level is successively lower than the comparison level during the number of times.

20. The control method according to claim 19, further comprising:
    storing a maximum value and a minimum value with respect to the voltage level of the driving power; and
    outputting information that the light emitting part is malfunctioning if the switch voltage level is lower than the comparison level when the driving power reaches the maximum value.

21. The control method according to claim 19, further comprising:
    storing a maximum value and a minimum value with respect to the voltage level of the driving power; and
    outputting information that the light emitting part is malfunctioning if the switch voltage level is higher than the comparison level when the driving power reaches the minimum value.

22. The control method according to claim 17, wherein a current flowing through the switching part is measured and a reference current is used to control the switching part using so that the measured current is within a same range as the reference current.

* * * * *